United States Patent
Iyer

(10) Patent No.: US 10,917,375 B2
(45) Date of Patent: Feb. 9, 2021

(54) METHOD AND DEVICE FOR MANAGING MESSAGES IN A COMMUNICATION DEVICE

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/370,123

(22) Filed: Mar. 29, 2019

(65) Prior Publication Data
US 2020/0314052 A1   Oct. 1, 2020

(30) Foreign Application Priority Data
Mar. 29, 2019   (IN) .............................. 201941012667

(51) Int. Cl.
| | | |
|---|---|---|
| G06F 15/16 | (2006.01) | |
| H04L 12/58 | (2006.01) | |
| G06N 3/08 | (2006.01) | |
| H04L 12/861 | (2013.01) | |

(52) U.S. Cl.
CPC .............. H04L 51/26 (2013.01); G06N 3/08 (2013.01); H04L 49/9005 (2013.01)

(58) Field of Classification Search
None
See application file for complete search history.

(56) References Cited

U.S. PATENT DOCUMENTS

| | | | |
|---|---|---|---|
| 8,520,695 B1* | 8/2013 | Rubin | G01C 21/26 370/445 |
| 2006/0178918 A1* | 8/2006 | Mikurak | G06Q 10/06 705/7.25 |
| 2012/0030682 A1 | 2/2012 | Shaffer et al. | |
| 2014/0229164 A1* | 8/2014 | Martens | G06F 40/40 704/9 |
| 2017/0193083 A1 | 7/2017 | Bhatt et al. | |
| 2017/0295591 A1 | 10/2017 | Nguyen et al. | |
| 2018/0048567 A1* | 2/2018 | Ignatchenko | H04L 45/3065 |
| 2018/0139131 A1* | 5/2018 | Ignatchenko | H04L 43/10 |
| 2018/0212893 A1 | 7/2018 | Dev | |
| 2019/0258671 A1* | 8/2019 | Bou | G06N 5/022 |

* cited by examiner

*Primary Examiner* — Phuoc H Nguyen
(74) *Attorney, Agent, or Firm* — Finnegan, Henderson, Farabow, Garrett & Dunner, LLP

(57) ABSTRACT

A method of managing messages in a communication device is disclosed. The method includes receiving messages through a communication device. Critical messages may be determined by identification of one or more critical content in the one or more messages and analyzed based on the context and content associated with the critical messages. A priority for each of the critical messages may be generated by assigning vocabulary weight to the critical content and a context weight to the critical message. The critical messages may be queued based on their respective priorities. Dynamic allocation of resources by adjusting at least one of buffer, and packet delay associated with the communication device based on the priority of the one or more messages in the queue is done. The one or more messages in the communication device may be managed based on the queuing and the dynamic allocation of resources.

17 Claims, 5 Drawing Sheets

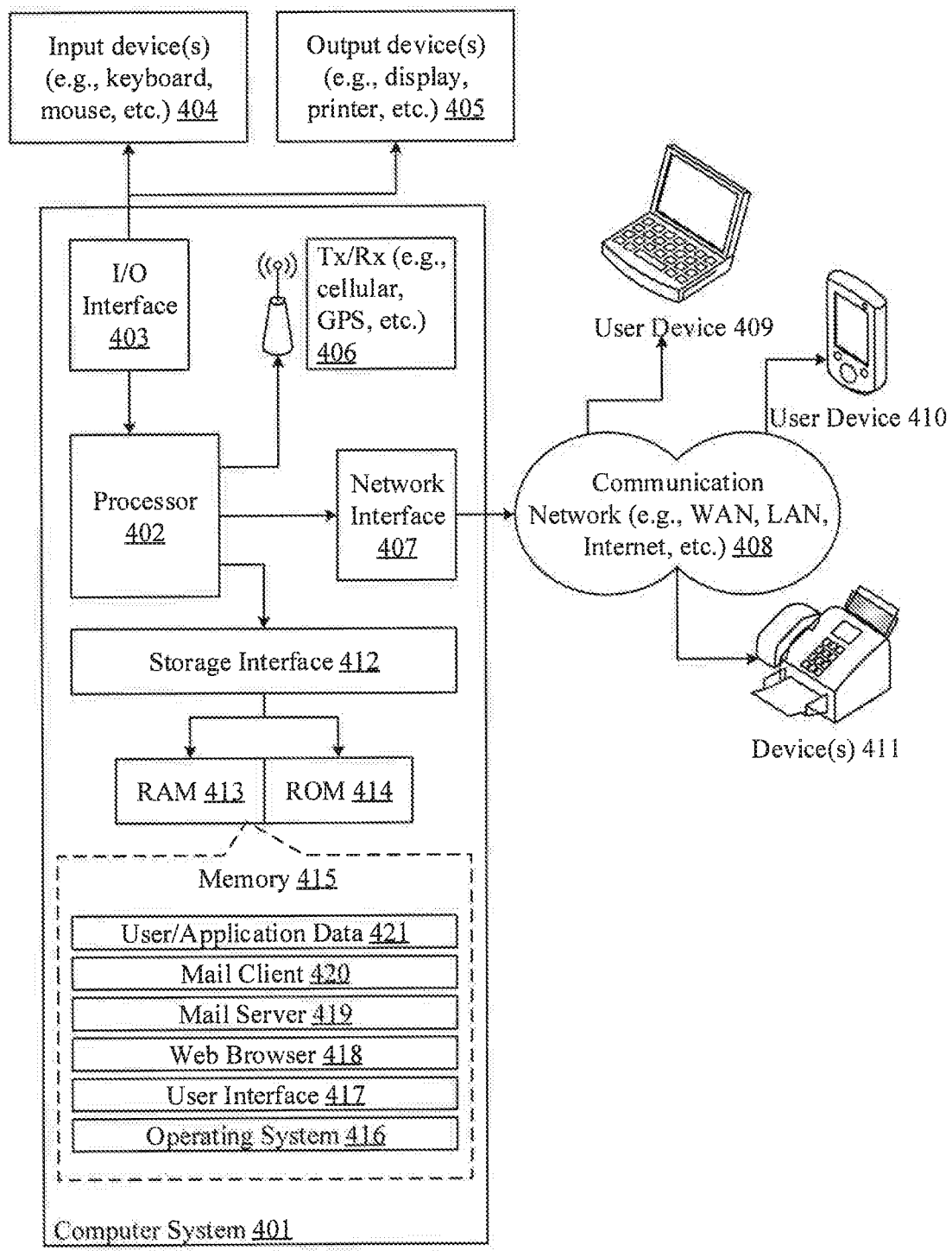
FIG. 4 Example Computer System

METHOD AND DEVICE FOR MANAGING MESSAGES IN A COMMUNICATION DEVICE

TECHNICAL FIELD

The present subject matter is related, in general, in general to prioritizing messages for communication over wireless systems, and more particularly, but not exclusively to a method and device for managing messages in a communication device.

BACKGROUND

In devices such as laptop, server or router that is connected to internet, when multiple connected applications are running, or multiple messages are being received, they compete for the common resources. Unless the applications, and consequently the data packets involved in the application, are assigned with priorities, it is not possible to execute any of the applications optimally. At present there is a mechanism to assign priorities to packets of certain applications such as tele-surgery data packets, ambulance data packets, real-time communication related data packets (RTP/SIP based calls) and the like to carry defined high priority. Further, there are some mechanisms for data/message priority scheduling, like storing messages in distributed bins and setting the individual bins priority, bandwidth-based priority, priority based on information source or recipient, priority based on load balancing of content type for sender & receiver.

However, presently importance is not given a user-based message data that might be critical at times. Delaying or denying connection to such a user messages may lead to unintended consequences, especially during critical/emergency situations. In prior art, priority of transmission of emails is assigned based on relative significance/associations of words present inside the emails content is known. Performing actions to messages is set by using Natural Language Processing (NLP) for identifying the event and relating the event to performing an action pertaining to the event like summarizing open questions pertaining to the event, summarizing event details, identifying popular answers, generating response lists, automatically sending reminder messages, updating calendars, etc. However, the mechanism does not prioritize messages and manage resources accordingly.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method of managing messages in a communication device. The method may include, receiving one or more messages through a communication device. The method may include, identifying dynamically one or more critical content in the one or more messages and determining one or more critical messages based on the identification. The method may further include, generating a priority to each of the one or more critical messages based on the analysis. The method may include, analyzing the one or more critical messages based on the content and context associated with the one or more critical messages and assigning vocabulary weight to each of the one or more critical content and a context weight to the critical message. The method may include, generating a priority to each of the one or more critical messages based on the analysis. Further, the method may include queuing the one or more messages based on the priority of each of the one or more critical messages. Further, the method may include dynamically allocating resources by adjusting at least one of packet buffer, and packet delay associated with the communication device based on the priority index of the one or more messages in the queue. Further, the method may include managing the one or more messages in the communication device based on the queuing and the dynamic allocation of resources.

According to embodiments illustrated herein, there may be provided a device for managing messages in a communication device. The device may include a processor communicatively coupled to a memory. The memory may store processor-executable instructions. The processor may execute the processor-executable instructions to receive one or more messages via a communication device. The processor may execute the processor-executable instructions to identify dynamically one or more critical content in the one or more messages and determining one or more critical messages based on the identification. The processor may execute the processor-executable instructions to analyze the one or more critical messages based on the content and context associated with the one or more critical messages and assign vocabulary weight to each of the one or more critical content and a context weight to the critical message. The processor may execute the processor-executable instructions to generate a priority to each of the one or more critical messages based on the analysis. The processor may execute the processor-executable instructions to queue the one or more messages based on the priority of each of the one or more critical messages. The processor may execute the processor-executable instructions to dynamically allocate resources by adjusting at least one of buffer, and packet delay associated with the communication device based on the priority index of the one or more messages in the queue. The processor may execute the processor-executable instructions to manage the one or more messages in the communication device based on the queuing and the dynamic allocation of resources.

According to another embodiment illustrated herein there may be provided a non-transitory computer readable medium including instructions stored thereon that when processed by at least one processor cause the processor to receive one or more messages via a communication device. Further, the instructions may cause the processor to identify dynamically one or more critical content in the one or more messages and determining one or more critical messages based on the identification. Further, the instructions may cause the processor to analyze the one or more critical messages based on the content and context associated with the one or more critical messages and assign vocabulary weight to each of the one or more critical content and a context weight to the critical message. Further, the instructions may cause the processor to generate a priority to each of the one or more critical messages based on the analysis. Further, the instructions may cause the processor to queue the one or more messages based on the priority of each of the one or more critical messages. Further, the instructions may cause the processor to dynamically allocate resources by adjusting at least one of buffer, and packet delay associated with the communication device based on the priority index of the one or more messages in the queue. Further, the instructions may cause the processor to manage the one or more messages in the communication device based on the queuing and the dynamic allocation of resources.

The foregoing summary is illustrative only and is not intended to be limiting in any way. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures.

FIG. 4 is block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and the like indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Present disclosure relates particularly to the managing messages in a communication device by priority scheduling of messages based on content and context of a message provided by an user and dynamic allocation of resources. The content and the context determine the nature of criticality of the messages. Instead of static/rule based priority assignment to a message, the criticalities of other messages in the device are also considered. For content and context analysis user gestures, emotions are taken into account. E.g. if a person is speaking to doctor anxiously about chest pain, the messages and connection are assigned high priority.

Figure 1:
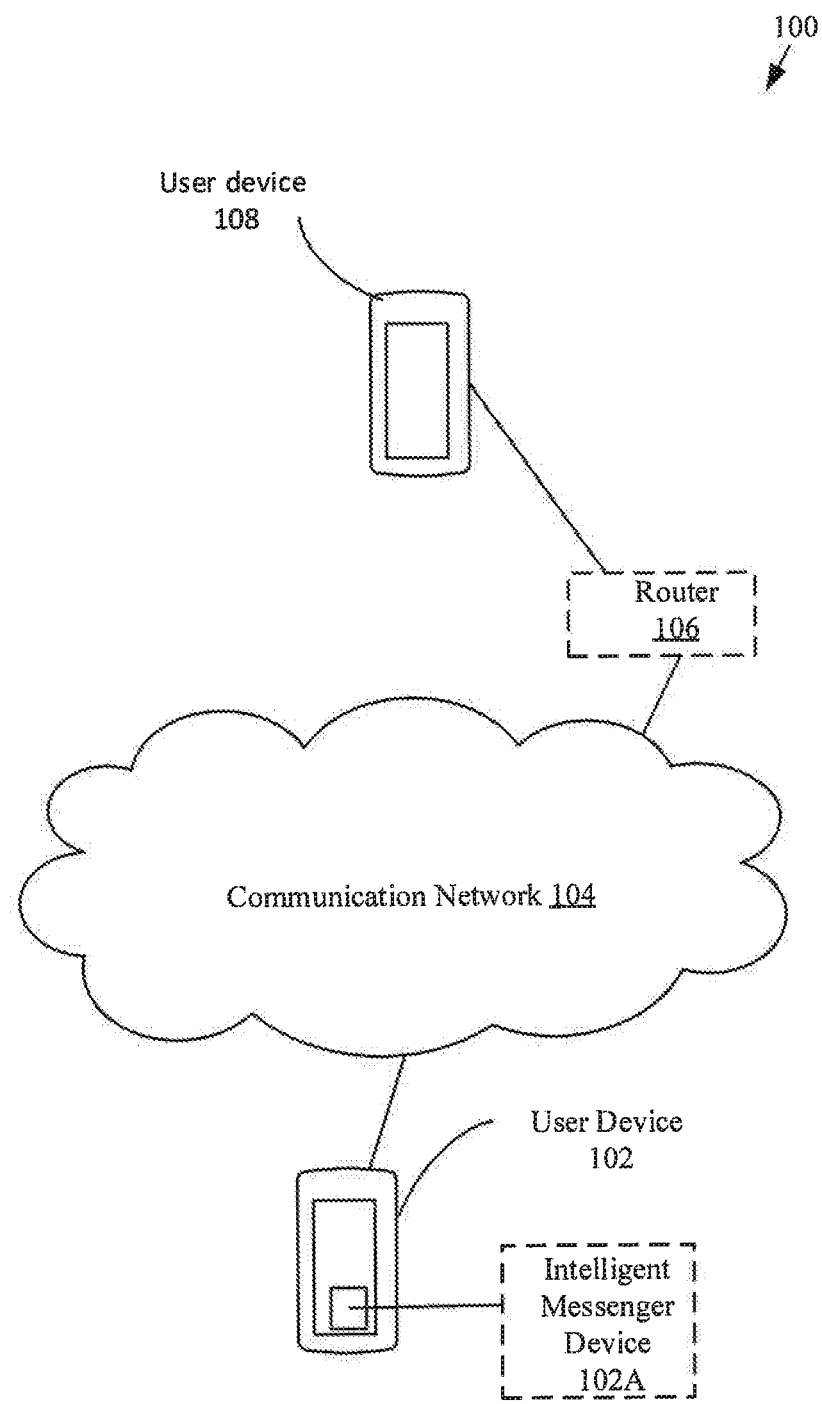
FIG. 1 is a block diagram that illustrates an exemplary system environment in which a method and device for managing messages in a communication device may be implemented.

FIG. 1 is a block diagram that illustrates an example environment 100 in which various embodiments of the method and device for managing messages in a communication device may be implemented. The environment 100 may include communication devices such as user device 102 and user device 108 and a router 106. The communication devices such as 102 and 108 communicate with each other in the environment 100 through a communication network 104 comprising of router 106. In this exemplary scenario the user device 102 is hosting an intelligent messenger device 102A, in accordance to some embodiments of the present invention. It may be noted that the intelligent messenger device 108 may be hosted by any communication device such as mobile phones, routers and the like that is capable of transmitting and receiving messages via a communication network such as communication network 104.

In accordance to some embodiments of the present disclosure, the communication network 104 may correspond to a communication medium through which communication devices such as mobile device or telephone may be connected and may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In the example environment 100 the user device 102 is a mobile device that is in communication with user device 108 via the communication network 104. In an alternate scenario, the intelligent messenger device (IMD) 102A could be within communication devices such as user device 108 or router 106. In some embodiments, an intelligent messenger device such as IMD 102A is integrated to a communication device such as user device 102, router 106 or user device 108.

In an embodiment, user device 102 is in communication with user device 108. The messages are transmitted via the communication network 104. In this exemplary scenario, as depicted by system 100, the intelligent messenger device 102A is located at the user device 102 and which determines critical messages. The intelligent messenger device 108 may receive one or more messages via a communication device which is here the user device 102. The intelligent messenger device 102A may identify dynamically one or more critical content in the one or more messages that have been received in the router 108 and determine one or more critical messages based on the identification. The intelligent messenger device 102A may further analyze the one or more critical messages based on the context and content associated with the one or more critical messages and assigning vocabulary weight to each of the one or more critical content and a context weight to the critical message.

The intelligent messenger device 102A may generating a priority to each of the one or more critical messages based on the analysis and queue the one or more messages based on the priority of each of the one or more critical messages. In some embodiments, historical information, presence of one or more critical messages in the packet buffer and availability of the packet buffer associated with the communication device may be considered while queuing the messages. Further, the intelligent messenger device 102A may be dynamically allocating resources by adjusting at least one of packet buffer, and packet delay associated with the user device 102 based on the priority of the one or more messages in the queue. The intelligent messenger device 108 therefore manages the one or more messages in the user device 102 based on the queuing and the dynamic allocation of resources. In the present exemplary system environment as depicted by FIG. 1, the user device 102 may further transmit the messages based on the queuing and the dynamic allocation of resources. In some alternate embodiments, the communication device such as user device 108 hosting the intelligent messenger device such as Intelligent messenger device 112A may be configured to receive the critical messages in the communication device based on the queuing and the dynamic allocation of resources.

It may be noted that in some embodiments, an intelligent messenger device such as IMD 102A may be implemented in a communication device which may be a smartphone, computer, laptop, tablet, phablet, router and the like. In an example, the intelligent messenger device may be implemented in router 106 where it may receive the messages for transmission. In an alternate embodiment, where the intelligent messenger device 108 is implemented within the user device 108 which may be a smartphone, computer, laptop, tablet, phablet and the like, which is the recipient of the one or more messages that are being transmitted from user device 102, the intelligent messenger device may receive the one or more messages via user device 108 which is a communication device. The intelligent messenger device, in such implementation, may be configured to display, communicate or alert the one or more critical messages to the user B on priority by queuing based on the priority of the one or more critical messages and dynamic allocation of resources.

In the exemplary scenario associated with the FIG. 1, user A of user device 102 may be communicating with user B of user device 108. User A may be experiencing severe chest pain and explaining the problem to user B who is a doctor. While User A is narrating to User B on the health issue, the mobile connectivity may experience issues and become very slow due to an auto update or a video download happening in the background on user device 102. In this scenario, the intelligent messenger device 102A in the user mobile phone such user device 102 may receive the one or more messages queued for transmission. The intelligent messenger device 102A may be capable of determining the criticality of message based on identification of one or more critical content in the one or more messages.

In an example, the user may utter words like "I am experiencing great pain near chest". The word "pain" and "chest" may trigger urgency and qualify the message as a critical message. The intelligent messenger device 102A may analyze the one or more critical messages based on the context and content associated with the one or more critical messages and assign vocabulary weight to each of the one or more critical content and a context weight to the critical message. This message "I am experiencing great pain in my chest" may be further analyzed for content and context and a priority may be assigned. The intelligent messenger device 102A may generate a priority to each of the one or more critical messages based on the analysis. Further, the intelligent messenger device 102A may queue the one or more messages based on the priority of each of the one or more critical messages.

Further, resources may be dynamically allocated by the intelligent messenger device 102A, by adjusting at least one of packet buffer, and packet delay associated with the user device 102 based on the priority of the one or more messages in the queue. In some embodiments, adjustments of buffer and packet delay are made a few time steps ahead by predicting the buffer occupancy based on the rate of inflow and outflow of packets. It may not be possible to accommodate new data packets when the buffer is full. Based on this prediction, low priority packets may be dropped, or the sources of data are requested to reduce data rate by using text instead of video to convey high priority messages (if both are available). In some embodiments, adjustments of buffer and packet delay includes avoiding buffering of local data by shutting off one or more local applications such as music play in the communication device such as user device 102. In this example, the video download happening at the background of the user device 102 may be shut down by revoking the application associated with the video download. Revoking an application here may include pausing an application.

Further the one or more messages in the communication device may be managed based on the queuing and the dynamic allocation of resources. In the exemplary scenario, the communication device (user device 102) transmits the one or more messages based on the queuing and the dynamic allocation of resources. Thus, as a result, all the background communications occurring in the user device 102 such as any update, upload or download and the like automatically take lesser precedence over the critical message and the critical message is conveyed without interruption.

Figure 2:
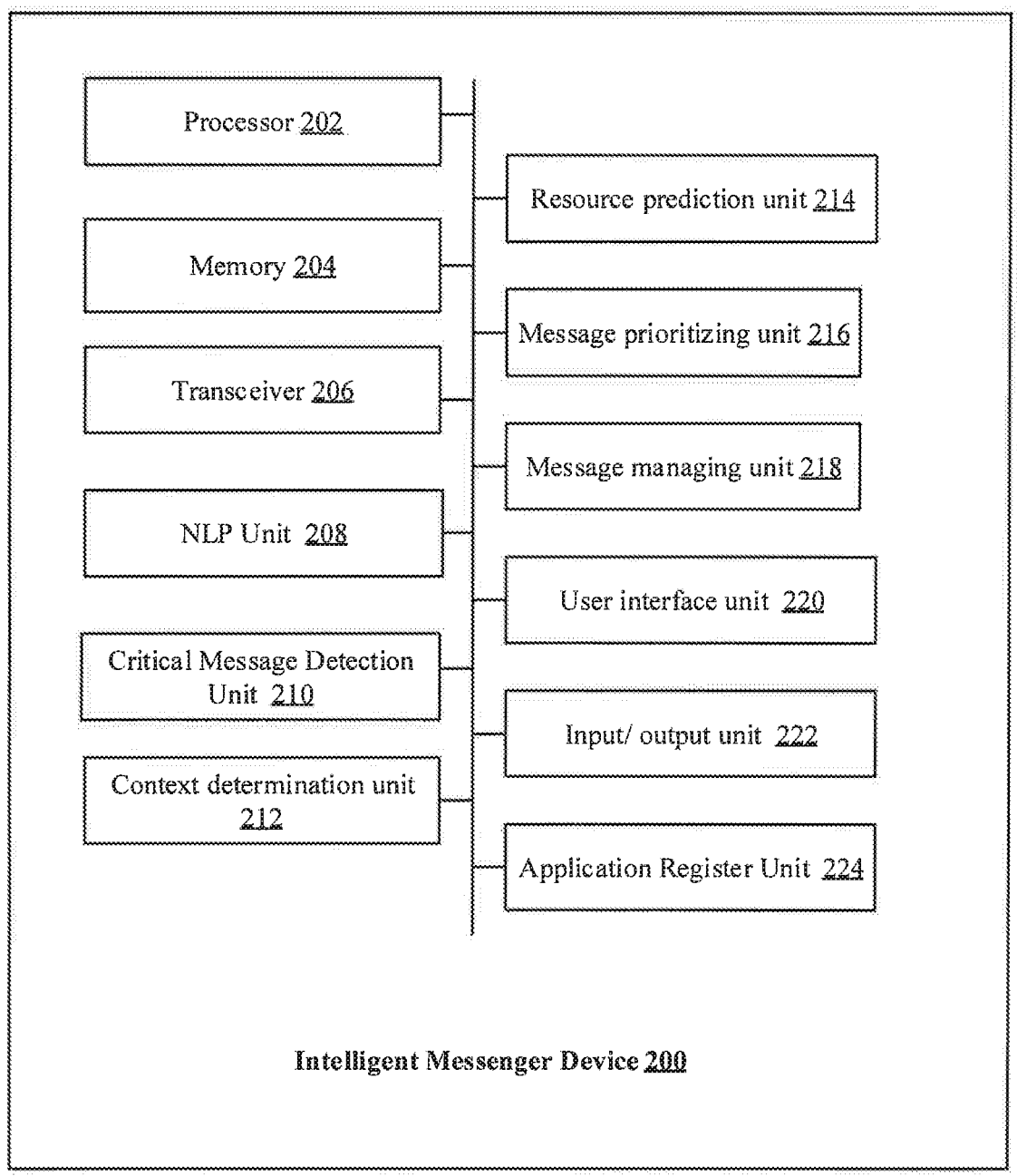
FIG. 2 is a block diagram that illustrates an intelligent messenger device in accordance with some embodiments of the present disclosure.

FIG. 2 is a block diagram illustrating a device for managing messages in a communication device in accordance with some embodiments of the present disclosure. The intelligent messenger device (IMD) 200 illustrated herein is similar to the IMD 102A of system 100 as illustrated in FIG. 1. The IMD 200 comprises a processor 202, a memory 204, a transceiver 206, an NLP unit 208, a critical message detection unit 210, a context determination unit 212, a resource prediction unit 214, a message prioritizing unit 216, a message managing unit 218, an user interface unit 220 an input/output unit 222 and an application register unit 224. The processor 202 may be communicatively coupled to the memory 204, the transceiver 206 and the various units from 208-224.

The processor 202 comprises suitable logic, circuitry, and interfaces that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which may be executed by the processor 202. In an embodiment, the memory 204 may be configured to store one or more programs, routines, or scripts that may be executed In coordination with the processor 202. The memory 204 may be implemented based on a Random Access Memory (RAM), a Read-Only Memory (ROM), a Hard Disk Drive (HDD), a storage server, and/or a Secure Digital (SD) card.

The intelligent messenger device 200 may include a natural language processing (NLP) unit 208 that may comprise suitable logic, circuitry, and interfaces that may be configured to parse messages that are textual in nature. In some embodiments, the natural language procession unit 208 may convert messages such as video or image or sound into text messages and parse the text messages.

The intelligent messenger device 200 may include a critical message detection unit 210 comprising suitable logic, circuitry, interfaces, and/or code that may be configured to receive the one or more messages that have been parsed from the NLP unit 208. The critical message detection unit 210 may identify one or more critical content in the one or more messages. The critical message detection unit 210 may determine one or more critical messages based on the identification. The critical message detection unit 210 may determine the one or more critical messages based on one or more predefined keywords and select them for further analysis by the context determination unit 212. In some embodiments, the critical message detection unit 210 may determine critical content of the one or more messages received via a communication device associated with the intelligent messenger device 200. In some embodiments, the critical message detection unit 210 may assign a vocabulary weight to each of the one or more critical content associated with the one or more messages received by the communication device. In an embodiment, the critical message detection unit 210 may assign vocabulary weight to each of the one or more critical content is based on pre-defined weight associated with the one or more pre-defined keywords.

The intelligent messenger device 200 may include a context determination unit 212 that may comprise suitable logic, circuitry, interfaces, and/or code that may be configured to analyze the one or more messages based on context. In some embodiment the context determination unit 212 may receive the one or more critical messages that have been identified by the critical message detection unit 210. In some embodiments, context determination unit 212 that may assign a context weight to the one or more critical messages by contextual analysis of the messages using natural language processing (NLP). In some embodiments, context determination unit 212 may assign a context weight based on sentiment analysis of the one or more critical messages using the convolutional neural network (CNN). In some embodiments, context determination unit 212 that may assign a context weight to the one or more critical messages based on sentiment analysis and contextual analysis of the messages using natural language processing.

Figure 2A:
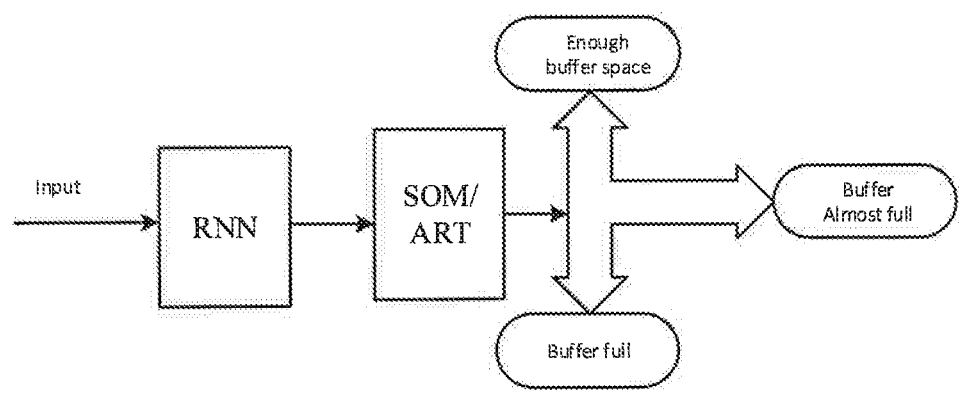
FIG. 2A is a block diagram that illustrates the prediction of buffer availability for managing messages in accordance to some embodiments of the present disclosure.

The intelligent messenger device 200 may include a resource prediction unit 214. The resource prediction unit 214 may be configured to perform prediction of buffer availability. In some embodiments the resource prediction unit 214 may perform prediction of the delay & jitter limit of failure with the Adaptive Resonance Theory (ART) neural network or self-organizing map (SOM) neural network as shown in the FIG. 2A. The data packets arriving from different sources form a pattern that is learnt by a recurrent neural network (RNN). The RNN maintains historical data that helps in observing the variations over a period and arrive at a temporal pattern. These patterns are fed to an ART/SOM network to classify the status of the buffer a few steps ahead of time. Input of the system consists of the present buffer size, the packet delay and the delay variation. The output is the predicted state of the buffer for a future instant as shown in FIG. 2A as way of example, which may be predicted as "buffer full", "almost full", or "enough buffer space".

Figure 2B:
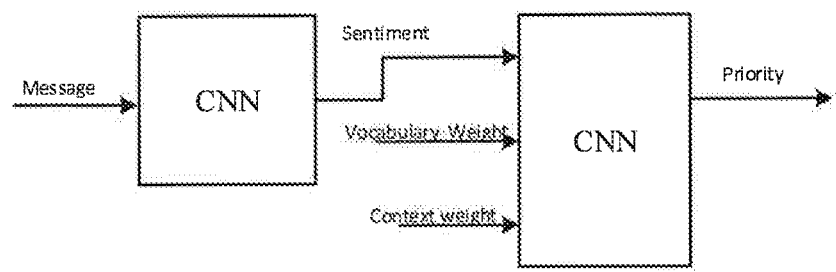
FIG. 2B is a block diagram that illustrates the generation of priority in accordance to some embodiments of the present disclosure.

The Intelligent messenger device 200 may include a message prioritizing unit 216 that may comprise suitable logic, circuitry, interfaces, and/or code that may be configured to assign priority to the one or more critical messages. In some embodiments, the message prioritizing unit 214 may determine the priority of the one or more critical messages based on the vocabulary weight and the context weight of the one or more critical messages. In some embodiments, the message prioritizing unit 216 may determine priority of the one or more critical messages based on the sentiment, the vocabulary weight and the context weight as shown in FIG. 2B. In some embodiments, the message prioritizing unit 216 may assign priorities to the one or more messages based on classification into various classes. In an example, the classification may be natural disaster, personal emergency, entertainment and the like which may have their own priorities. The message prioritizing unit 216 may use a heterogeneous classifier to map the input text, video or image messages to the various message bins. The one or more critical messages may be checked if it falls in to any of the predetermined bins such as natural disaster, personal emergency, medical, entertainment etc. In an example, the priorities may be in the descending order with personal emergency bin ranking highest, then followed by medical bin, natural disaster bin, and so on.

In some embodiments, an other messages unit (not shown in Fig) may receive one or more messages for various other applications or sources related to the communication device. In some embodiments, message prioritizing unit 216 may receive messages from the other messages unit (not shown in Fig) and assign priorities to the one or more messages. In some embodiments, the message prioritizing unit 216 may queue the messages based on the priorities of the each of the messages. In an example, among the high priority bins, if there are two or more messages from different sources having same priority then priority may be assigned for text over image and video. Among the high priority bins, if there are two or more messages from different sources in the communication device having same priority then messages falling under the personal emergency bin would have higher priority over the message falling under the entertainment bin.

The intelligent messenger device 200 may include a message managing unit 218 that may comprise suitable logic, circuitry, interfaces, and/or code that may be configured to manage the one or more messages. In some embodiments, the message managing unit 218 may transmit one or more messages based on the queuing and dynamic allocation of resources based on the resource prediction done by the resource prediction unit 214. In some embodiments, the message managing unit 218 may receive one or more messages in the communication device and alert the user of the communication device based on the queuing and dynamic allocation of resources based on the resource prediction done by the resource prediction unit 214. In some embodiments, the message managing unit 218 dynamically allocate resources by one of invocation or revocation of one or more application running in the communication device such as user device 102. In some embodiments, based on the prediction of buffer availability by the resource prediction unit 214, the message managing unit 218 may drop low priority packets from the queue. In some embodiments, based on the prediction of buffer availability by the message managing unit 218, may be configured to shut down one or more applications to avoid buffering of data. In some embodiments, in absence of critical messages in the queue the message managing unit 218 may invoke the one or more applications that was revoked for transmission of one or more critical messages. The application register unit 224 may provide necessary information on buffer utilization of various applications running at the backend of the user device 102. In some embodiments, the message managing unit 218 may be configured to request to reduce data rate by using text instead of video to convey high priority the user interface unit 220. In some, embodiments, the user may select video/voice or text message option via the input/output unit 222.

Further, the transceiver 206 comprises suitable logic, circuitry, and interfaces that may be configured to retrieve a set of operations associated with the communication device to transmit or receive one or more messages. The transceiver 206 may be configured to receive one or more messages. The transceiver 206 may be configured to transmit one or more messages. In some embodiments, the transceiver 206 may transmit or receive the critical messages based on resource allocation and availability as predicted by resource prediction unit 214. The transceiver 206 may implement one or more known technologies to support wired or wireless communication with the communication network. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer.

The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Text message Service (SMS).

The user interface unit 220 may include suitable logic, circuitry, interfaces, and/or code that may be configured to provide the necessary user interfaces for the clients to provide various input options to a user of the communication device such as user device 102. In some embodiments the user interface unit 220 may work in conjunction with the transmitter and display messages that have been prioritized or delayed based on the priority.

The intelligent messenger device 200 may include an Input/Output (I/O) unit 222 that comprises suitable logic, circuitry, and interfaces that may be configured to receive an input or provide an output. The Input/Output (I/O) unit 222 comprises various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker. In an embodiment, the I/O unit 222 may work in conjunction with the user interface module 218 to provide the user an interface to the user for providing inputs and to receive outputs.

The intelligent messenger device 200 may include an application register unit 224 that registers various applications running on the user device 102. It includes video, if any, associated with message, applications downloading videos such as movies, music and other multimedia content. In some embodiments, intelligent messenger device 200 maintains status of one or more applications in the application register unit 224. Applications such as video, music or any other upload or download at the background of the communication device hosting the intelligent messenger device 200 may have their status maintained in the application register unit 224.

In operation, the intelligent messenger device 200 may receive one or more messages via the user device 102 that the user is transmitting or receiving. The NLP unit 208 receives the one or messages and parses them into tokens. In an example, the message received by the NLP unit 208 may be "Hurry! Call the ambulance!". The message may be parsed into tokens such as "Hurry", "Ambulance" and "call". The critical message detection unit 210 may determine one or more critical contents in the message based on comparing the parsed message as received from the NLP unit 208 with a vocabulary database. In the preceding example, the critical contents identified may be "ambulance" and "hurry". In some embodiments, the critical message detection unit 210 may compare the tokens with a vocabulary database to determine its vocabulary weight. The vocabulary database includes pre-defined weight associated with the one or more pre-defined keywords. The predefined keywords may be words indicative of urgency or criticality in a message. Words such as "urgent", "emergency", "accident", "help" and any other word that may indicate seriousness of an issue may be listed in the vocabulary database. In an example the word "Fire" may be assigned a criticality weight of 0.4 while "pain" may be assigned as 0.7. In the example as given the word "ambulance" may have high vocabulary weight of 1. In some embodiments any tokens or combination of tokens in the message having associated vocabulary weight threshold of more than 0.7 may qualify as critical content and thereby the message may be identified as a critical message. In an example the word pain may have criticality weight of 0.5 while the words severe pain may have vocabulary weight of 1.

In some embodiments, the parsed text resulting in tokens are compared with the vocabulary database to get a latent semantic index (LSI). Based on a threshold say 0.5, the highest matching term is taken as similar term. Thus, any words can be mapped to an equivalent word in stored vocabulary. In some embodiments, for video message, captions may be generated using a trained convolutional neural network (CNN). The captions which are in text form, will undergo parsing in NLP unit 208 to get the tokens. The tokens are then mapped to the vocabulary database of the critical message detection unit 210 to detect critical content in the one or more messages.

The context determination unit 212 may then determine the context weight of the identified one or more critical messages. The context determination unit 212 may determine the context weight based on contextual analysis of the messages using natural language processing. In some embodiments, previous messages such as previous utterances by a user in a voice call or video is subjected to contextual analysis. In some embodiments context determination unit 212 may be configured to estimate associated sentiments of the one or more messages and historical messages associated with a communication session with a trained convolutional neural network (CNN). The sentiments may modulate the vocabulary weight of the critical content, as determined by the critical message detection unit 210. In some embodiments, for video messages, duration of the video, rapidity of movements, emotion in the tone and audio level may be considered to determine context weight of the message. In some embodiments, if the past messages in a communication session or associated communication session includes critical content then this may increase the context weight associated with the critical message. In an example, if user A's past conversation have contained the critical contents such as "emergency", "fire", "help" "hurry" then the contextual weight of the message may be high due to the presence of a number of critical contents. In an example the context weight may be the sum total of vocabulary weight of the critical contents in the one or more messages with in the past ten minutes.

Figure 2C:
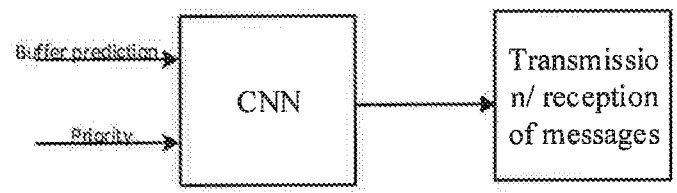
FIG. 2C is a block diagram that illustrates the managing of messages in accordance to accordance to some embodiments of the present disclosure.

The resource prediction unit 214 may perform prediction of buffer availability as explained earlier in conjunction with FIG. 2A. The message prioritizing unit 216 may determine priority for each of the the one or more messages based on the context weight that is modulated by the vocabulary weight. In some embodiments, the message prioritizing unit 216 may assign priority to the one or more critical messages based on the sentiment, vocabulary weight and context weight. The message prioritizing unit 214, may generate a priority for each of the one or more critical messages. The message prioritizing unit 214, may queue the messages based on the priority of the each of the one or more critical messages. The one or more critical messages may be an image, audio or text message. In some embodiment, if more than one modality of message originates from the same source, for example the user device 102, the highest weight message is picked up for transmission first. In some embodiments, the message prioritizing unit 214 may queue the messages in accordance to the priority of the each of the messages which may include critical messages. In accordance to some embodiments, messages from different sources in the communication device (e.g. user device 102) and historical messages within a predefined time period may be considered for the purpose of queuing. In some embodiments, as shown in FIG. 2c the message prioritizing unit 214 may provide the input of buffer prediction and priority to the CNN and manage the one or more messages by either transmission or reception of message based on the implementation of the disclosure. In some embodiments, if the criticality in the message is resolved with the lapse of time, the message priority is reduced based on the vocabulary weight and the context weight.

In accordance to some embodiments, a convoluted neural network (CNN) is initially trained with inputs such as messages that may include video, images and audio (as text features or word embeddings), vocabulary database and free buffer space. During deployment, when the message has no video, the buffer input channel may be switched off. The CNN network may be trained to associate sentiment with audio or text well.

In some embodiments, if a message which may be a video, contend with another video of high priority, the bandwidth may be shared proportional to their relative priorities. In an example, if more than one message is directed to the same recipient, the most informative message may get the higher priority. The information is assessed based on the priority of the message. This assessment may be done by the other messages unit (not shown in Fig) before allocation of resources by the resource prediction unit 216. Similarly, if the two or more messages are directed to the same recipient have common information, the most informative may have the higher priority. In case of video or image messages this is determined by converting the video or images in to text and compared with the native text messages.

The message managing unit 218 may consider the ongoing task of the communication device such as user device 102 with the help of the application register unit 224. The message managing unit 218 may dynamically allocate resources by adjusting at least one of packet buffer, and packet delay associated with the communication device based on the priority index of the one or more messages in the queue. In some embodiments, the message managing unit 218 may adjusting packet buffer and/or packet delay based on invocation or revocation of one or more application running in the communication device.

Figure 3:
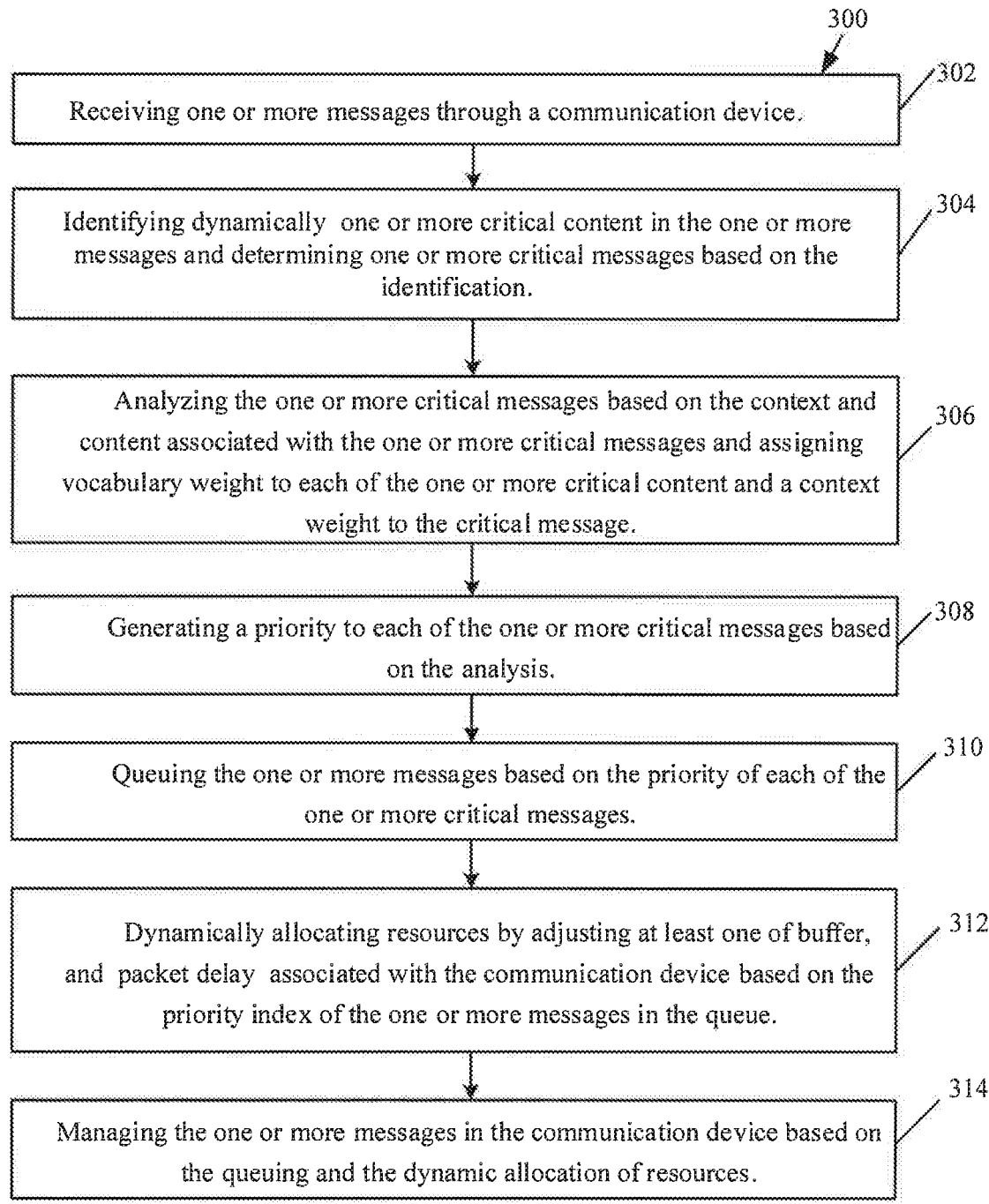
FIG. 3 is a flowchart illustrating a method of managing messages in a communication device, in accordance with some embodiments of the present disclosure.

FIG. 3 illustrates an exemplary sequence diagram for managing message in a communication device in accordance with some embodiments consistent with the present disclosure. The sequence diagram of FIG. 3 illustrates a sequence of steps by which priority of the critical messages may be assigned based on content and context and thereby the critical messages may be allocated resources for transmission or reception based on the queuing and allocated resources. Further, the one or more messages may be queued based on their priority and thereby managed by transmitting or receiving via the communication device based on allocated resources.

A method 300 for managing messages in a communication device by an intelligent messenger device such as intelligent messenger device 200 in accordance with some embodiments of the present disclosure provided in the flowchart of FIG. 3 At step 302, intelligent messenger device 200 may receive one or more messages through a communication device. The one or more messages may include at least one of audio, video, and text messages. At step 304 the intelligent messenger device 200 may identify dynamically one or more critical content in the one or more messages and determine one or more critical messages based on the identification. The identification of one or more critical content may be done by first performing natural language processing and converting the text of the message into tokens. The tokens may be mapped to a vocabulary database containing predefined keywords with assigned predefined weights. The critical content may be determined by identifying the presence of keywords with high predefined weight. Based on the presence of the one or more critical content presence of one or more critical messages may be detected.

At step 306, the intelligent messenger device 200 may analyze the one or more critical messages based on the context and content associated with the one or more critical messages and assign vocabulary weight to each of the one or more critical content and a context weight to the critical message. In some embodiments, vocabulary weight may be assigned to each of the one or more critical content is based on pre-defined weight associated with the one or more pre-defined keywords. In some embodiments, the context weight is assigned based on sentiment analysis of the one or more critical messages using the convolutional neural network (CNN) and contextual analysis of the messages using natural language processing (NLP).

At step 308 the intelligent messenger device 200 may generate a priority to each of the one or more critical messages based on the analysis. At step 310, the one or more messages may be queued by the intelligent messenger device 200, based on the priority of each of the one or more critical messages. In some embodiments, the queuing may be based on at least one of historical information such as messages in a communication session or previous communication sessions within a predetermined time interval, presence of one or more critical messages in the packet buffer and availability of the packet buffer associated with the communication device.

At step 312, intelligent messenger device 200 may dynamically allocate resources by adjusting at least one of packet buffer, and packet delay associated with the communication device based on the priority of the one or more messages in the queue. Further at step 214, the one or more messages may be managed by way of transmission or reception in the communication device based on the queuing and the dynamic allocation of resources.

Computer System

FIG. 4 illustrates a block diagram of an exemplary computer system for implementing embodiments consistent with the present disclosure. Variations of computer system 401 may be used for managing one or more messages in a communication device. The computer system 401 may comprise a central processing unit ("CPU" or "processor") 402. The processor 402 may comprise at least one data processor for executing program components for executing user-generated or system-generated requests. A user may include a person, a person using a device such as such as those included in this disclosure, or such a device itself. The processor 402 may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 610, 611, and 612. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices referred in the FIG. 6 as Memory 615 (e.g., RAM 613, ROM 614, etc.) via a storage interface 612. The storage interface 802 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User Interface 617 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 618 stored program component. The web browser 618 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 619 stored program component. The mail server 619 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server 619 may utilize communication protocols such as internet text message access protocol (IMAP), messaging application programming interface (MAPI), Microsoft Exchange, post office protocol (POP), simple mail transfer protocol (SMTP), or the like. In some embodiments, the computer system 401 may implement a mail client 620 stored program component. The mail client 620 may be a mail viewing application, such as Apple Mail, Microsoft Entourage, Microsoft Outlook, Mozilla Thunderbird, etc.

In some embodiments, computer system 401 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and device of managing messages in a communication device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

While, the present state of art mechanism fails to identify the urgency of messages based on its content and assigning (high) priority dynamically (for a short while if it is critical), especially at the edge of the network, the present invention prioritizes messages based on content and context analysis. Further the present invention is capable of allocating resources for seamless transmission or reception of critical messages sent by users. Deriving the content & context-based information from the message in real-time is in itself a challenge. In case of video messages/live videos having critical/urgency information, prioritization of delivery of such messages are important and are being addressed in the present disclosure. Further, the present disclosure is capable of dynamically allocating resources based on priority of messages and hence can release the resources once the criticality of situation has passed.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

I claim:

1. A method of managing messages in a communication device, the method comprising:
   receiving, by an intelligent messenger device, one or more messages via a communication device;
   identifying dynamically, by the intelligent messenger device, one or more critical content in the one or more messages and determining one or more critical messages based on the identification;
   analyzing, by the intelligent messenger device, the one or more critical messages based on the content and context associated with the one or more critical messages and assigning vocabulary weight to each of the one or more critical content and a context weight to the critical message;
   generating, by the intelligent messenger device, a priority to each of the one or more critical messages based on the analysis;
   queuing, by the intelligent messenger device, the one or more messages based on the priority of each of the one or more critical messages and at least one of historical information, presence of one or more critical messages in a packet buffer associated with the communication device and availability of the packet buffer associated with the communication device;
   dynamically allocating resources, by the intelligent messenger device, by adjusting at least one of the packet buffer, and packet delay associated with the communication device based on the priority of the one or more messages in the queue; and
   managing, by the intelligent messenger device, the one or more messages in the communication device based on the queuing and the dynamic allocation of resources.

2. The method as claimed in claim 1, wherein the managing comprises at least one of transmitting and receiving the one or more messages via the communication device.

3. The method as claimed in claim 1, wherein the one or more messages comprise at least one of audio, video, and text messages.

4. The method as claimed in claim 1, wherein the one or more critical content is identified based on one or more predefined keywords and wherein assigning the vocabulary weight to each of the one or more critical content is based on pre-defined weight associated with the one or more pre-defined keywords.

5. The method as claimed in claim 1, wherein the context weight is assigned based on sentiment analysis of the one or more critical messages using a convolutional neural network (CNN) and contextual analysis of the messages using natural language processing (NLP).

6. The method as claimed in claim 1, wherein dynamically allocating the resources further comprises one of invocation or revocation of one or more application running in the communication device.

7. An intelligent messenger device for managing messages in a communication device comprising:
   a processor; and
   a memory communicatively coupled to the processor, wherein the memory stores processor-executable instructions, which, on execution, causes the processor to:
      receive one or more messages via a communication device;
      identify dynamically one or more critical content in the one or more messages and determining one or more critical messages based on the identification;
      analyze the one or more critical messages based on the content and context associated with the one or more critical messages and assigning vocabulary weight to each of the one or more critical content and a context weight to the critical message;

generate a priority to each of the one or more critical messages based on the analysis;

queue the one or more messages based on the priority of each of the one or more critical messages and at least one of historical information, presence of one or more critical messages in the packet buffer and availability of the packet buffer associated with the communication device;

dynamically allocate resources by adjusting at least one of packet buffer, and packet delay associated with the communication device based on the priority index of the one or more messages in the queue; and manage the one or more messages in the communication device based on the queuing and the dynamic allocation of resources.

8. The device as claimed in claim 7, wherein the managing comprises at least one of transmitting and receiving the one or more messages via the communication device.

9. The device as claimed in claim 7, wherein the one or more messages comprise at least one of audio, video, and text messages.

10. The device as claimed in claim 7, wherein the one or more critical content is identified based on one or more predefined keywords and wherein assigning the vocabulary weight to each of the one or more critical content is based on a pre-defined weight associated with the one or more pre-defined keywords.

11. The method as claimed in claim 7, wherein the context weight is assigned based on sentiment analysis of the one or more critical messages using a convolutional neural network (CNN) and contextual analysis of the messages using natural language processing (NLP).

12. The device as claimed in claim 7, wherein dynamically allocating the resources further comprises one of invocation or revocation of one or more application running in the communication device.

13. A non-transitory computer-readable medium storing computer-executable instructions for managing messages in a communication device, the computer-executable instructions configured for:

receiving one or more messages via a communication device;

identifying by the intelligent messenger device, one or more critical content in the one or more messages and determining one or more critical messages based on the identification;

analysing the one or more critical messages based on the content and context associated with the one or more critical messages and assigning vocabulary weight to each of the one or more critical content and a context weight to the critical message;

generating a priority to each of the one or more critical messages based on the analysis;

queuing the one or more messages based on the priority of each of the one or more critical messages and at least one of historical information, presence of one or more critical messages in the packet buffer and availability of the packet buffer associated with the communication device;

dynamically allocating resources by adjusting at least one of the packet buffer, and packet delay associated with the communication device based on the priority of the one or more messages in the queue; and managing the one or more messages in the communication device based on the queuing and the dynamic allocation of resources.

14. The non-transitory computer-readable medium of claim 13, wherein the managing comprises at least one of transmitting and receiving the one or more messages via the communication device.

15. The non-transitory computer-readable medium of claim 13, wherein the one or more critical content is identified based on one or more predefined keywords and wherein assigning the vocabulary weight to each of the one or more critical content is based on a pre-defined weight associated with the one or more pre-defined keywords.

16. The non-transitory computer-readable medium of claim 13, wherein the context weight is assigned based on sentiment analysis of the one or more critical messages using a convolutional neural network (CNN) and contextual analysis of the messages using natural language processing (NLP).

17. The non-transitory computer-readable medium of claim 13, wherein dynamically allocating the resources further comprises one of invocation or revocation of one or more application running in the communication device.

* * * * *